(12) United States Patent
Bichigov et al.

(10) Patent No.: US 8,526,687 B2
(45) Date of Patent: Sep. 3, 2013

(54) METHOD FOR FILTERING A FINGERPRINT IMAGE CONTINUATION-IN-PART

(76) Inventors: Vladimir Nickolaevich Bichigov, Chelyabinskaya obl. (RU); Alexandr Vladimirovich Moksin, Chelyabinskaya obl. (RU); Ivan Borisovich Shapshal, Chelyabinskaya obl. (RU); Pavel Anatolievich Zaytsev, Chelyabinskaya obl. (RU)

( * ) Notice: Subject to any disclaimer, the term of this patent is extended or adjusted under 35 U.S.C. 154(b) by 976 days.

(21) Appl. No.: 12/071,226

(22) Filed: Feb. 19, 2008

(65) Prior Publication Data

US 2008/0144894 A1 Jun. 19, 2008

Related U.S. Application Data

(63) Continuation-in-part of application No. PCT/RU2007/000612, filed on Nov. 6, 2007.

(30) Foreign Application Priority Data

Nov. 8, 2006 (RU) ................................ 2006140704

(51) Int. Cl.
*G06K 9/00* (2006.01)
(52) U.S. Cl.
USPC ............................ 382/124; 382/125; 382/131
(58) Field of Classification Search
USPC .......................... 382/124, 125, 261, 262, 263
See application file for complete search history.

(56) References Cited

U.S. PATENT DOCUMENTS

| | | | | |
|---|---|---|---|---|
| 5,101,469 A | * | 3/1992 | Oda | 385/131 |
| 5,333,216 A | * | 7/1994 | Sakata et al. | 385/28 |
| 2002/0168093 A1 | * | 11/2002 | Sanders et al. | 382/125 |
| 2003/0039382 A1 | * | 2/2003 | Yau et al. | 382/125 |
| 2005/0180614 A1 | | 8/2005 | Pandit | |
| 2005/0185828 A1 | | 8/2005 | Semba | |
| 2005/0201596 A1 | * | 9/2005 | Hwang et al. | 382/124 |
| 2005/0265587 A1 | | 12/2005 | Schneider | |
| 2006/0147096 A1 | * | 7/2006 | Lee et al. | 382/124 |
| 2006/0153432 A1 | | 7/2006 | Lo | |
| 2006/0153433 A1 | | 7/2006 | Lo | |
| 2007/0047785 A1 | * | 3/2007 | Jang et al. | 382/125 |
| 2008/0095413 A1 | * | 4/2008 | Yau et al. | 382/125 |

OTHER PUBLICATIONS

A. Erol, U. Halici, G. Ongun, "Feature Selective Filtering for Ridge Extraction" (c) 1999 by CRC Press LLC. [http://books.google.com/books?id=QkiS78MrTTcC&pg=PA318&lpg=PA318&dq=a+erol+u+halici+g+ongun+%22feature+selective+filtering+for+ridge+extraction%22+c+1999+by+crc+press+llc&source=web&ots=ZSkx7LNHpU&sig=eTkiGulvKFdL5qVLJal930TvZ-M#PPR10,M1].

* cited by examiner

*Primary Examiner* — Vu Le
*Assistant Examiner* — Aklilu Woldemariam

(57) ABSTRACT

The present invention relates to the digital processing of images, and, more particularly, to the digital filtering of fingerprint images. The present invention can be used in criminalistics for fingerprint identification.
The object of the present invention is to develop a method for filtering a fingerprint image, that provides effective image processing in the areas where the curvature of fingerprint lines is high.
This object is achieved by providing a method for filtering a fingerprint image, the method including the step of sequentially processing areas of the image by a directional filter having at least one central ridge and adapted to local properties of respective areas of the image, the local properties including distance between the ridges, orientation of the fingerprint line, and curvature of the same. Further steps include adapting the filter to the local curvature by curving at least one central ridge of the filter in the plane of spatial coordinates in such a way its curvature is brought into proximity with the curvature of the fingerprint line.

6 Claims, 2 Drawing Sheets

METHOD FOR FILTERING A FINGERPRINT IMAGE CONTINUATION-IN-PART

CROSS-REFERENCE TO RELATED APPLICATIONS

This application is a continuation-in-part application of international application PCT/RU2007/000612 filed on Nov. 6, 2007 and claiming priority from Russian patent application 2006140704 filed on Nov. 8, 2006

FIELD OF THE INVENTION

The invention relates to digital processing of images and, more particularly, to digital filtering of fingerprint images. The present invention can be used in criminalistics for fingerprint identification.

BACKGROUND OF THE INVENTION

Computer technologies are currently used in dactyloscopy for processing and identification of images (fingerprints and palmprints). Low quality of fingerprints may lead to erroneous image comparison. To avoid errors, images are improved or filtered by means of digital directional filters. Current methods of filtration are only effective for where the curvature of fingerprint lines is low, and ineffective for filtering high-curvature regions.

Digital filter is a mathematical function of two variables that defines a three-dimensional surface. Thus, a filter can have various specific shapes. Filters for improving fingerprint images have one or more parallel ridges, wherein the central ridge is most essential for filtering. This kind of filter acts selectively, that is increases average brightness of pixels in the valley between the ridges and decreases average brightness of pixels in the neighborhood of the ridge.

In practical use of such filter a matrix of coefficients (also known as mask) is developed on the basis of driving function of the filter. This matrix is then applied to the neighborhood of the processed pixel to set its new value of brightness.

The filter is most effective when the orientation of its ridges coincides with the orientation of fingerprint ridges in the area to which the filter is applied. However, the image may have regions in which fingerprint lines have greater curvature, i.e. significantly change their direction along the length of the filter. In this case the filter can only be aligned with the line along a short line section, whereas the rest of the line is oriented differently, and this affects the results of filtration.

Filtration of such regions may result in that false elements emerge on the image, while true elements are lost. To reduce filter-induced image distortions, the filter coverage is usually reduced in the curved. For this reason the sections of greater curvature are poorly filtered.

A method for improving fingerprint image is known from A. Erol, U. Halici, G. Ongun, "Feature Selective Filtering for Ridge Extraction" (c) 1999 by CRC Press LLC. According to Erol et al. an image is processed with a filter adapted (by means of changing its coefficients) to the local properties in the neighborhood of the processed region.

The filter used in this method is an restricted version of the Gabor filter that is designed to give maximum response to ridges at a specific orientation and spacing on the fingerprint image. The impulse response of the filter is given by the product of a Gaussian and a cosine plane wave.

In the spatial domain, when the square variance of the Gaussian is high enough, the filter responds maximally to fingerprint ridges with spacing frequency equal to the magnitude of the wave vector and oriented orthogonal to its direction. The main lobe in the middle matches to the ridge and the side lobes with smaller amplitude correspond to the neighboring ridges.

To adapt the filter to the local properties of the image the following local values are used:
local ridge spacing; and
local ridge orientation.

The ridge spacing determines both the magnitude of the wave vector and the variance of the Gaussian. The magnitude of the wave vector corresponds to the frequency of the cosine along the wave vector.

Experiments have shown that the filter construction rules stated above work very well when the orientation and ridge spacing are estimated correctly. However errors in the estimation of orientation distorts the image and results in loss of true minutiae or creation of spurious minutiae.

It is usually not possible to estimate orientation correctly neither in the low quality nor in the high-curvature regions of the image. As a solution to the problem, the orientation angle is complemented with a measure of orientation certainty. This orientation certainty factor is used to adjust the variance of the Gaussian. The regions with low orientation certainty are processed using a filter with variance less than those used in high-certainty regions.

Further, analyzing experimental testing of this method, Erol et al. concludes that high-curvature regions of fingerprint lines shows unacceptably low certainty. This results in degradation of filtering efficiency and even incapability to distinguish fingerprint lines in these regions.

Thus, Erol et al. merely provide an automatic method for restricting filtering degree in the regions that are difficult to process, rather than solve the problem of correctly processing high-curvature regions.

The closest prior art to the present invention is a method for improving fingerprint images (U.S. Application No 2005163394, Scholze, 28.06.2005). In this method, image areas are sequentially processed with a directional filter adapted to the local properties of these image areas, the local properties including ridge spacing, fingerprint line orientation and curvature. To determine the local properties, the image is divided into square areas. For each area local properties are then determined. For each point to be processed Gabor filter is used in accordance with the local properties of the image. To adapt the filter to the local curvature, the Fourier transform of the filter is effected, and particularly, the direction of the main axes, as well as the position and size of the bounding ellipse in the frequency domain is changed within the filter bandpass. In the areas where the direction of fingerprint lines substantially changes, the bandpass is increased. This results in decrease of the filter selectivity and, consequently the filter efficiency in the presence of typical artifacts of fingerprint image.

BRIEF SUMMARY OF THE INVENTION

The object of the present invention is to provide a method for fingerprint image filtering, that provides effective image processing of high-curvature regions.

The object is attained by providing a method for filtering a fingerprint image, the method including the following steps: sequentially processed image areas with a directional filter having at least one central ridge, and adapted to local properties of said image areas. Said local properties include fingerprint ridge spacing, orientation and curvature. According to said method, the filter is adapted to the local curvature by curving at least one central ridge of the filter in the plane of spatial coordinates to approximate its curvature to the local curvature of the fingerprint ridge.

As a result, high-curvature regions of the fingerprint lines can be filtered without loss of efficiency.

Said ridge may be curved by developing the filter in the curvelinear coordinate system having two sets of coordinate lines, wherein the coordinate lines of the first set are straight and perpendicular to the tangent to fingerprint ridge in the point being processed, and the coordinate lines of the second set are curved, and their curvature corresponds to the local curvature of the fingerprint ridge, whereas zero of the coordinate system is aligned with the point being processed.

Said ridge may also be curved by developing said filter in the polar coordinate system.

The ridge may take the form of an arc of circle, wherein the curvature of said arc may be equal to the local curvature of the fingerprint line.

The directional filter may be Gabor filter.

A detailed description of the present invention is given below with reference to accompanying drawings, wherein

DETAILED DESCRIPTION OF THE INVENTION

The method for filtering a fingerprint image will be described in more details below.

Figure 1:
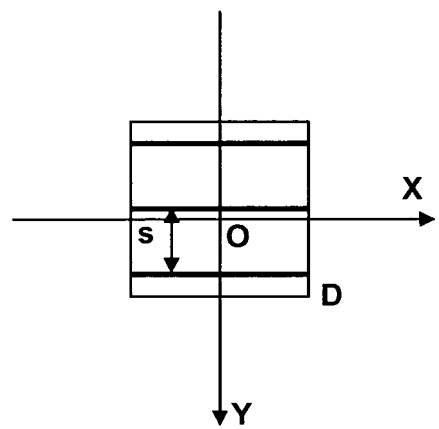
FIG. 1 shows a schematic diagram of a reference filter.

At the first stage of processing a reference filter F(x, y) is developed using known methods (analytically). The reference filter is optimized for filtering an ideal fingerprint image that consists of horizontal fingerprint lines having constant ridge spacing. The filter, that is determined by the function F(x, y), is developed in the field D as shown in FIG. 1.

Further steps are to be made sequentially on each point of the processed image.

Figure 2:
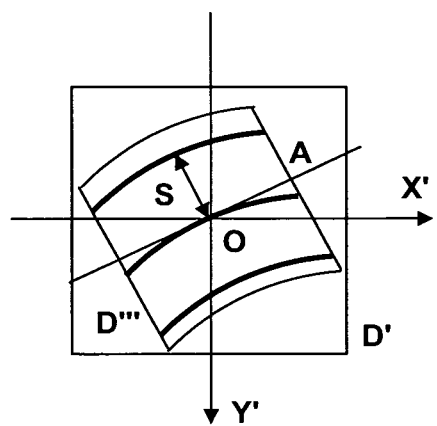
FIG. 2 schematically shows a fragment of fingerprint pattern.

In the coordinate system OX'Y' a neighborhood is chosen for the point O to be processed. The neighborhood shall include several fingerprint ridges. In this neighborhood, local properties of the image are determined. As shown in FIG. 2, the direction of fingerprint lines is determined at each central point of a fingerprint ridge or valley, wherein this direction is assumed to be the direction of line A which is tangent to this fingerprint ridge or valley. In the other points in the neighborhood the direction is determined by interpolation of the values calculated for the central points. To reduce the influence of image artifacts these directions are smoothed over the neighborhood of point O. The ridge spacing S in the neighborhood of point O is determined in the direction that is perpendicular to the lines direction at this point. The calculated values are then averaged over the neighborhood. Curvature C is determined in the point O directly, without any averaging.

For the point to be processed, the filter is developed, the filter being adapted to the local properties of the image determined for said point. These properties include direction, spacing and curvature of fingerprint ridges. To adapt the filter to the local properties of the image, the filter is subjected to scaling, orientation and curving.

Figure 3:
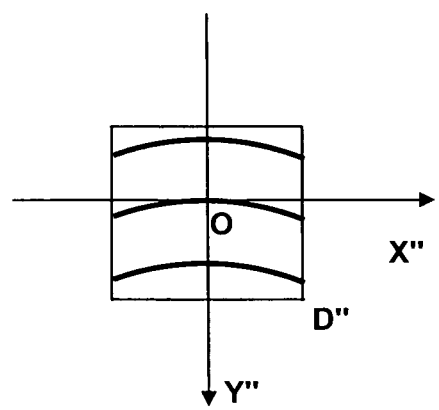
FIG. 3 shows a schematic diagram of the filter after its orientation and scaling.
Figure 5:
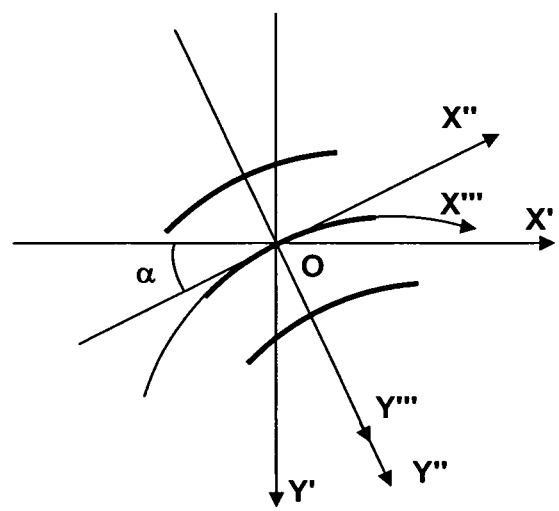
FIG. 5 shows the relative position of the coordinate systems used.

To effect orientation and scaling of the filter a rectangular coordinate system OX"Y" is set. In this coordinate system, zero is aligned with point O to be processed, X" axis is parallel to the fingerprint lines at point O, and Y" axis is perpendicular to the fingerprint lines as shown in FIGS. 3 and 5. In the coordinate system a square field D" is defined which is symmetric about X" and Y" coordinate axes. Dimensions of the field D" are calculated as the product of the D field dimensions by scaling coefficient $$M=S/s,$$

where S is the ridge spacing at point O, and is the constant ridge spacing of an ideal fingerprint.

Field D" defines the base of oriented and scaled filter.

The oriented and scaled filter defined by F(x", y") function, is then developed in the field D". In the filer, x" and y" coordinates in the OX"Y" coordinate system are expressed in terms of the coordinates in the OX'Y' coordinate system as follows $$x''=M \cdot x' \cdot \cos(\alpha)+M \cdot y' \cdot \sin(\alpha);$$

$$y''=M \cdot y' \cdot \cos(\alpha)+M \cdot x' \cdot \sin(\alpha),$$

where M is the scaling coefficient, and $\alpha$ is the angle between the fingerprint line and the tangent to said fingerprint line at point O.

Further, the rectangular coordinate system is transformed into a curvilinear coordinate system which has two sets of coordinate lines (Y''' and X''') and has Zero aligned with point O to be processed. Coordinate lines Y''' are straight and perpendicular to the local direction of fingerprint lines at the point to be processed. Coordinate lines X''' are curved, and their curvature corresponds to the local curvature C of the fingerprint line. Particularly, coordinate line X''' may take the form of an arc of circle having a radius R=1/C.

Figure 4:
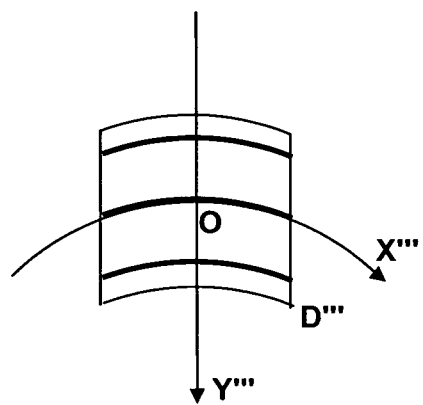
FIG. 4 shows a schematic diagram of the filter after its curving.

In said curvilinear coordinate system a field D''' is then defined (as shown in FIG. 4) as a curvilinear image of the field D". The height of the field D''' measured along the Y''' axis is equal to the height of the field D". The width of the field D''' measured in the direction that is perpendicular to the Y''' axis is equal to the width of the field D".

Then a filter is developed in the field D''' as a function F(x''', y''') of curvelinear coordinates. Coordinates x''', y''' are expressed in terms of coordinates x", y" with regard to the radius R:

$$x'''=R \cdot \arcsin(x''/R),$$

$$y'''=y'' \pm (R-sqrt(R \cdot R-x'' \cdot x'')),$$

where x", y" are coordinates of the filter in the coordinate system OX"Y", x''', y''' are coordinates of the filter in the coordinate system OX'''Y''', and R is the radius of fingerprint line.

Further, a mask of coefficients (mask of filter) is determined for the image being processed. For this purpose a square field D' is defined in the coordinate system OX'Y'. The field D' shall be sufficient for inscribing a rotated curvelinear field D''' therein, as shown in FIG. 2.

Then curvilinear coordinates are determined for the points located in the field D'. For each of these points filter coefficients are determined relating to the filter that is developed in the field D'''.

The values of filter coefficients I(x', y') for the points located in the field D' are set as equal to the values of the coefficients of the reference filter developed in curvilinear coordinates x''', y''':

$$I(x',y')=F(x''', y''').$$

For the points located in the field D' but out of the field D''', zero values of coefficients are set.

In such a way, the matrix of coefficients (mask of filter) is developed, wherein dimensions of the matrix are equal to the dimensions of the field D'. The using of this mask in the field D' allows to get a new value of brightness for the point O being processed at this stage.

Further, the steps described above shall be repeated for the next point of the image.

We claim:

1. A method for filtering a fingerprint image, the method including the step of filtering image areas of the fingerprint image one after another by a computing device using a two-dimensional directional filter, wherein the two-dimensional directional filter has at least one central rib, wherein prior to the filtering the two-dimensional directional filter is transformed subject to local properties of said image areas, said local properties including the fingerprint ridge spacing orientation and curvature, wherein the transformation of the filter to the local curvature is provided by curving the two-dimensional directional filter in the plane of spatial coordinates to approximate the curvature of the central rib of the filter to the local curvature of the fingerprint ridge.

2. A method according to claim 1 characterized in that said ridge is curved by developing the filter in the curvilinear coordinate system having two sets of coordinate lines, wherein the coordinate lines of the first set are straight and perpendicular to the tangent to fingerprint ridge in the point being processed, and the coordinate lines of the second set are curved, and their curvature corresponds to the local curvature of the fingerprint ridge, whereas zero of the coordinate system is aligned the point being processed.

3. A method according to claim 1 characterized in that said ridge is curved by the developing of the said filter in the polar coordinate system.

4. A method according to claim 1 characterized in that a ridge takes the form of an arc of circle.

5. A method according to claim 4 characterized in that the curvature of the arc of circle is equal to the curvature of a fingerprint line.

6. A method according to claim 1 characterized in that the directional filter is Gabor filter.

* * * * *